US010108953B2

United States Patent
Ignatchenko et al.

(10) Patent No.: US 10,108,953 B2
(45) Date of Patent: Oct. 23, 2018

(54) APPARATUSES, METHODS AND SYSTEMS FOR COMPUTER-BASED SECURE TRANSACTIONS

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 724 days.

(21) Appl. No.: 13/861,701

(22) Filed: Apr. 12, 2013

(65) Prior Publication Data
US 2013/0275306 A1    Oct. 17, 2013

Related U.S. Application Data

(60) Provisional application No. 61/623,702, filed on Apr. 13, 2012.

(51) Int. Cl.
*G06Q 20/32* (2012.01)
*G06Q 20/38* (2012.01)
(Continued)

(52) U.S. Cl.
CPC ......... *G06Q 20/3227* (2013.01); *G06F 21/74* (2013.01); *G06F 21/84* (2013.01);
(Continued)

(58) Field of Classification Search
CPC ........ G06F 21/53; G06F 21/57; G06F 21/606; G06F 21/64; G06F 21/31; G06F 20/40;
(Continued)

(56) References Cited

U.S. PATENT DOCUMENTS 5,134,700 A    7/1992    Eyer et al.
5,500,897 A    3/1996    Hartman, Jr.
(Continued)

FOREIGN PATENT DOCUMENTS

EP    1 612 670 A2    1/2006
EP    2 045 753 A1    4/2009
(Continued)

OTHER PUBLICATIONS

Alsouri et al., "Group-Based Attestation: Enhancing Privacy and Management in Remote Attestation," *Trust and Trustworthy Computing*, 63-77 (Jun. 2010).
(Continued)

*Primary Examiner* — Mamon Obeid
*Assistant Examiner* — Edgar R Martinez-Hernandez
(74) *Attorney, Agent, or Firm* — Arnold & Porter Kaye Scholer LLP (57) ABSTRACT

The systems, methods and apparatuses described herein provide a computing environment for completing a secure transaction. An apparatus according to the present disclosure may comprise a screen, a first switching device coupled to the screen, an input device, a second switching device coupled to the input device, a non-secure processor, a secure processor and a credit card reader operatively coupled to the secure processor. The non-secure processor may generate a message containing a purchase transaction request. The secure processor may receive the message, assume control of the screen and input device while the apparatus is operating in a secure mode, establish a secure connection with a server, receive payment information to be submitted to the server, digitally sign certain transaction information and submit the digitally signed certain transaction information to the server to complete the secure transaction.

24 Claims, 5 Drawing Sheets

US 10,108,953 B2
Page 2

(51) Int. Cl.
*G06Q 20/12* (2012.01)
*G06F 21/74* (2013.01)
*G06F 21/84* (2013.01)
*H04N 21/478* (2011.01)

(52) U.S. Cl.
CPC ......... *G06Q 20/12* (2013.01); *G06Q 20/3823* (2013.01); *G06Q 20/3825* (2013.01); *G06Q 20/38215* (2013.01); *H04N 21/47815* (2013.01)

(58) Field of Classification Search
CPC .. G06F 20/3029; G06F 20/02; G06F 20/3821; G06F 20/38215; G06F 20/3823; G06F 20/401; G06F 20/382; G06F 20/40975; G06F 30/018; G06F 30/04; G06F 21/74; G06F 21/84; H04W 12/06; G06Q 20/3227; G06Q 20/12; G06Q 20/38215; G06Q 20/3823; G06Q 20/3825; G06Q 30/018; H04N 21/47815
USPC ........................................................ 705/64
See application file for complete search history.

(56) References Cited

U.S. PATENT DOCUMENTS

| | | | |
|---|---|---|---|
| 5,615,263 A | 3/1997 | Takahashi | |
| 5,677,955 A | 10/1997 | Doggett et al. | |
| 5,787,172 A | 7/1998 | Arnold | |
| 5,815,571 A | 9/1998 | Finley | |
| 5,832,206 A | 11/1998 | De Jesus et al. | |
| 5,896,499 A | 4/1999 | McKelvey | |
| 5,978,484 A | 11/1999 | Apperson et al. | |
| 6,088,684 A | 7/2000 | Custy et al. | |
| 6,091,823 A * | 7/2000 | Hosomi | G06Q 10/087 348/E5.096 |
| 6,092,202 A * | 7/2000 | Veil | G06F 21/34 705/64 |
| 6,163,771 A | 12/2000 | Walker et al. | |
| 6,385,727 B1 | 5/2002 | Cassagnol et al. | |
| 6,581,841 B1 | 6/2003 | Christoffersen | |
| 6,862,641 B1 | 3/2005 | Strongin et al. | |
| 7,065,654 B1 | 6/2006 | Gulick et al. | |
| 7,124,302 B2 * | 10/2006 | Ginter | G06F 21/10 713/189 |
| 7,337,314 B2 | 2/2008 | Hussain et al. | |
| 7,350,194 B1 | 3/2008 | Alpern | |
| 7,363,493 B2 | 4/2008 | Dotan | |
| 7,574,479 B2 | 8/2009 | Morris et al. | |
| 7,587,611 B2 | 9/2009 | Johnson et al. | |
| 7,636,858 B2 | 12/2009 | Khan et al. | |
| 7,681,046 B1 | 3/2010 | Morgan et al. | |
| 7,774,619 B2 | 8/2010 | Paaske et al. | |
| 7,779,252 B2 | 8/2010 | O'Brien et al. | |
| 7,797,544 B2 | 9/2010 | Dillaway et al. | |
| 7,853,531 B2 * | 12/2010 | Lao | G06Q 20/401 705/50 |
| 7,861,097 B2 | 12/2010 | Smeets et al. | |
| 7,882,221 B2 | 2/2011 | Sailer et al. | |
| 7,940,932 B2 * | 5/2011 | Paksoy | G06F 21/78 380/247 |
| 7,979,696 B2 | 7/2011 | Kim et al. | |
| 8,112,787 B2 * | 2/2012 | Buer | H04L 9/3271 713/168 |
| 8,386,785 B2 | 2/2013 | Kim et al. | |
| 8,656,482 B1 | 2/2014 | Tosa et al. | |
| 8,949,929 B2 | 2/2015 | Kelly et al. | |
| 8,959,183 B2 | 2/2015 | Zeller et al. | |
| 9,015,703 B2 | 4/2015 | Fitzgerald et al. | |
| 2002/0062438 A1 | 5/2002 | Asay et al. | |
| 2002/0183056 A1 | 12/2002 | Lundblade et al. | |
| 2003/0051169 A1 | 3/2003 | Sprigg et al. | |
| 2004/0010565 A1 * | 1/2004 | Hong | G01C 21/26 709/217 |
| 2005/0005161 A1 | 1/2005 | Baldwin | |
| 2005/0268103 A1 | 12/2005 | Camenisch | |
| 2006/0010447 A1 | 1/2006 | Egashira et al. | |
| 2006/0047959 A1 | 3/2006 | Morais | |
| 2006/0101408 A1 | 5/2006 | Kotamarthi et al. | |
| 2006/0107268 A1 | 5/2006 | Chrabieh | |
| 2006/0117177 A1 | 6/2006 | Buer | |
| 2006/0168663 A1 * | 7/2006 | Viljoen | G06Q 30/06 726/27 |
| 2006/0259790 A1 * | 11/2006 | Asokan | G06F 21/606 713/194 |
| 2007/0226807 A1 | 9/2007 | Ginter et al. | |
| 2008/0155540 A1 | 6/2008 | Mock et al. | |
| 2008/0208758 A1 * | 8/2008 | Spiker | G06F 21/83 705/70 |
| 2008/0270786 A1 | 10/2008 | Brickell et al. | |
| 2008/0306876 A1 * | 12/2008 | Horvath | G06Q 20/3821 705/76 |
| 2008/0316357 A1 * | 12/2008 | Achari | G06F 21/84 348/564 |
| 2009/0072032 A1 | 3/2009 | Cardone et al. | |
| 2009/0165141 A1 | 6/2009 | Kakehi et al. | |
| 2009/0172329 A1 | 7/2009 | Paver et al. | |
| 2009/0172411 A1 | 7/2009 | Kershaw et al. | |
| 2009/0210705 A1 | 8/2009 | Chen | |
| 2009/0254986 A1 * | 10/2009 | Harris | G06F 21/74 726/17 |
| 2009/0271618 A1 | 10/2009 | Camenisch et al. | |
| 2009/0300263 A1 | 12/2009 | Devine et al. | |
| 2009/0300348 A1 | 12/2009 | Aciicmez et al. | |
| 2009/0313468 A1 | 12/2009 | Hazlewood et al. | |
| 2009/0320048 A1 | 12/2009 | Watt et al. | |
| 2010/0031047 A1 | 2/2010 | Coker, II et al. | |
| 2010/0145854 A1 * | 6/2010 | Messerges | G06Q 20/32 705/44 |
| 2010/0192230 A1 * | 7/2010 | Steeves | H04L 63/08 726/26 |
| 2010/0269179 A1 | 10/2010 | Fahrny | |
| 2010/0293099 A1 * | 11/2010 | Pauker | G06Q 20/20 705/67 |
| 2011/0029771 A1 | 2/2011 | Mehta et al. | |
| 2011/0087887 A1 | 4/2011 | Luft et al. | |
| 2012/0072346 A1 * | 3/2012 | Barkan Daynovsky | G06Q 20/357 705/44 |
| 2012/0137117 A1 | 5/2012 | Bosch et al. | |
| 2012/0191575 A1 * | 7/2012 | Vilke | G06Q 30/0641 705/27.1 |
| 2012/0240194 A1 | 9/2012 | Nack Ngue | |
| 2013/0047034 A1 | 2/2013 | Salomon et al. | |
| 2013/0055347 A1 | 2/2013 | Chawla et al. | |
| 2013/0124415 A1 * | 5/2013 | Mardikar | G06Q 20/40 705/44 |
| 2013/0232339 A1 | 9/2013 | Ignatchenko et al. | |
| 2013/0238786 A1 | 9/2013 | Khesin | |
| 2013/0262891 A1 | 10/2013 | Gudlavenkatasiva et al. | |
| 2013/0275306 A1 | 10/2013 | Ignatchenko et al. | |
| 2013/0276064 A1 | 10/2013 | Ignatchenko et al. | |
| 2013/0283353 A1 | 10/2013 | Ignatchenko et al. | |
| 2013/0339742 A1 | 12/2013 | Ignatchenko et al. | |
| 2013/0346747 A1 | 12/2013 | Ignatchenko et al. | |
| 2013/0346760 A1 | 12/2013 | Ignatchenko | |
| 2014/0096182 A1 | 4/2014 | Smith | |
| 2014/0143538 A1 | 5/2014 | Lindteigen | |
| 2014/0196127 A1 | 7/2014 | Smeets et al. | |
| 2014/0279562 A1 | 9/2014 | Ignatchenko et al. | |
| 2014/0281500 A1 | 9/2014 | Ignatchenko | |
| 2014/0281560 A1 | 9/2014 | Ignatchenko et al. | |
| 2014/0281587 A1 | 9/2014 | Ignatchenko | |
| 2014/0282543 A1 | 9/2014 | Ignatchenko et al. | |
| 2015/0039891 A1 | 2/2015 | Ignatchenko et al. | |
| 2015/0089244 A1 | 3/2015 | Roth et al. | |
| 2016/0366139 A1 | 12/2016 | Ignatchenko et al. | |

FOREIGN PATENT DOCUMENTS

| | | |
|---|---|---|
| EP | 2 107 486 A2 | 10/2009 |
| EP | 2 113 855 A1 | 11/2009 |

(56) References Cited

FOREIGN PATENT DOCUMENTS

| EP | 2 278 514 A1 | 1/2011 |
|---|---|---|
| WO | 2001/017296 A1 | 3/2001 |
| WO | 2009/071734 A1 | 6/2009 |
| WO | 2009/111409 A1 | 9/2009 |
| WO | 2011/037665 A2 | 3/2011 |
| WO | 2012/014231 A1 | 2/2012 |

OTHER PUBLICATIONS

Anderson et al. "Cryptographic Processors—a survey", *Technical Report*, No. 641, University of Cambridge Computer Laboratory (Aug. 2005) (http://www.cl.cam.ac.uk/techreports/UCAM-CL-TR-641.pdf).

Anonymous, "TrustZone System Security by ARM the Architecture for the Digital World," retrieved from the Internet at http://www.arm.com/products/processors/technologies/trustzone/index.php (2014).

Chen et al., "A New Direct Anonymous Attestation Scheme from Bilinear Maps," *2008. ICYCS 2008. The 9th International Conference for Young Computer Scientists*, 2308-2313 (2008).

Garfinkel, "Terra: a virtual machine-based platform for trusted computer," *ACM SOSP. Proceedings of the ACM Symposium on Operating Systems Principles*, 193-206 (2003).

Guo et al., "A New DAA Scheme From One-off Public Key," *Electronics, Communications and Control (ICECC), 2011 International Conference*, 646-649 (Sep. 2011).

International Search Report and Written Opinion issued in PCT/IB2013/000680 dated Sep. 5, 2013.

International Search Report and Written Opinion issued in PCT/IB2013/000672, dated Jul. 23, 2013.

International Search Report issued in PCT/IB2013/000741 dated Dec. 12, 2013.

International Search Report and Written Opinion issued in PCT/IB2014/059638 dated Jul. 3, 2014.

International Search Report and Written Opinion issued in PCT/IB2014/059839 dated Aug. 7, 2014.

International Search Report and Written Opinion issued in PCT/IB2014/059845 dated Aug. 8, 2014.

Liu et al., "A Remote Anonymous Attestation Protocol in Trusted Computing," *Parallel and Distributed Processing, 2008. IPDPS 2008, IEEE International Symposium*, 1-6 (2008).

Manulis et al., "UPBA: User-Authenticated Property-Based Attestation," *Privacy, Security and Trust (PST), 2011 Ninth Annual International Conference*, 112-119 (2011).

Suh et al., "AEGIS: Architecture for Tamper-Evident and Tamper-Resistant Processing," Computation Structures Group Memo 461, CSAIL Computer Science and Artificial Intelligence Laboratory, Massachusetts Institute of Technology (Feb. 2003).

Sun et al., "A Strict Inter-Domain Anonymity Attestation Scheme," *Computer Design and Applications (ICCDA), 2010 International Conference*, V3-291-V3-295 (2010).

Tanveer et al., "Scalable Remote Attestation with Privacy Protection (Work in Progress)," *Trusted Systems*, 73-87 (Dec. 2009).

Yu et al., "An anonymous property-based attestation protocol from bilinear maps," *Computational Science and Engineering, 2009. CSE '09, International Conference*, 2:732-738 (2009).

Yu et al., "Real-Time Remote Attestation with Privacy Protection," *Trust Privacy and Security in Digital Business*, 81-92 (Aug. 2010).

Zhang et al., "Improving Privacy of Property-based Attestation without a Trusted Third Party," *Computational Intelligence and Security (CIS), 2011 Seventh International Conference on Computational Intelligence and Security*, 559-563 (2011).

Bare, "Attestation and Trusted Computing," CSEP 590: Practical Aspects of Modern Cryptography, 1-9 (2006).

Berger et al., "vTPM: Virtualizing the Trusted Platform Module," Security '06: 15th USENIX Security Symposium, *USENIX Association*, pp. 305-320 (2006).

International Search Report and Written Opinion dated Nov. 18, 2014, in International Application No. PCT/IB2014/063637.

Stumpf et al., "Improving the Scalability of Platform Attestation," Proceedings of the 3rd ACM workshop on Scalable trusted computing, *ACM*, pp. 1-10 (2008).

\* cited by examiner

APPARATUSES, METHODS AND SYSTEMS FOR COMPUTER-BASED SECURE TRANSACTIONS

RELATED APPLICATIONS

This application claims priority to U.S. Provisional Application 61/623,702 filed Apr. 13, 2012, entitled "Apparatuses, Methods and Systems for Computer-Based Secure Transactions," the content of which is incorporated herein by reference in its entirety.

FIELD OF THE DISCLOSURE

The systems, methods and apparatuses described herein relate to the security of computer network-based commercial and other sensitive data transactions.

BACKGROUND

Internet shopping, online banking, and other network-based forms of transmitting sensitive data are highly popular, but may be susceptible to a variety of security breaches resulting from computer viruses, backdoors, keyloggers and other forms of attacks on the user's computer or other consumer transaction device. These attacks generally relate to vulnerabilities in the operating system and/or application programs executing in the device that are used to access or communicate through the network.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The apparatuses, methods and systems according to the present disclosure protect online sale transactions against operating system and other software-based vulnerabilities within a consumer transaction device.

Figure 1:
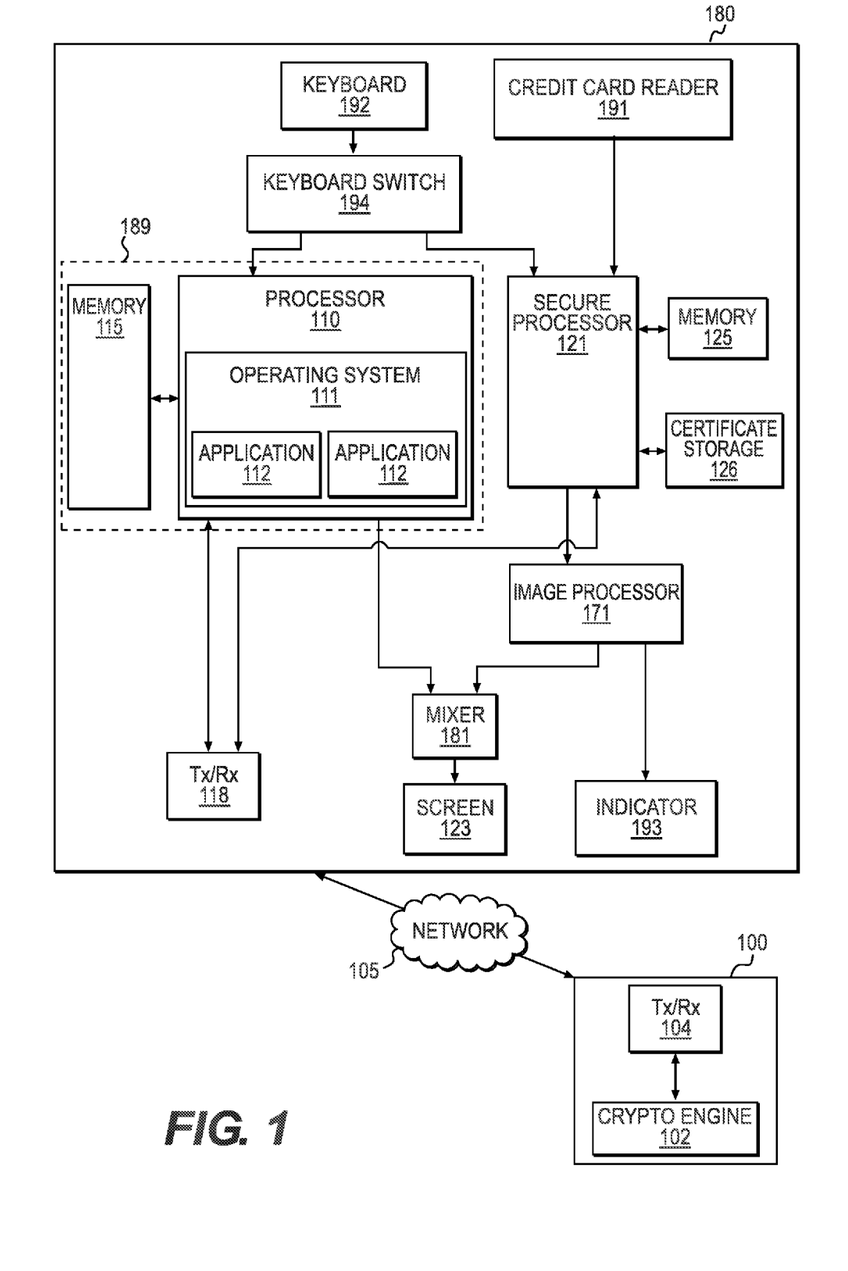
FIG. 1 is a block diagram of an exemplary system according to the present disclosure.

FIG. 1 shows one exemplary embodiment of a system according to the present disclosure. The system may first comprise one or more consumer transaction devices 180, i.e., any device from which a user may make a purchase from an e-commerce site, conduct banking transactions, or otherwise complete a network-based transaction for which it would be desirable to have increased security. Such a consumer transaction device 180 may be, for example, a desktop computer, a laptop, a tablet computer, a smart phone, a TV set, etc.

As will be described in greater detail below, the consumer transaction device 180 may operate, at any given time, in one of at least two modes: a non-secure mode and a secure mode. The secure mode may be used whenever the consumer transaction device 180 needs to communicate in a secure manner with an e-commerce web site, a bank or financial institution web site, database, or any other software running on a remote computer or collection of computers.

To support these at least two modes of operation, the consumer transaction device 180 may first comprise hardware components traditionally included in a computing device to effectuate a non-secure mode of operation, such as a processor 110, memory 115, communications port 118, etc., and traditional input/output devices such as a keyboard 192 and a screen 123. It is to be recognized that other forms of input or output devices may also be used such as a mouse and/or an infrared controller with a matching infrared receiver. In the non-secure mode, these components may be controlled by an operating system 111 and/or one or more applications 112, stored within memory 115, and running on the processor 110. As the operating system 111 and applications 112 are susceptible to hacking by a malicious party, they are considered insecure for the purposes of the present disclosure and accordingly are shown within the "non-secure zone" 189 indicated by the dashed lines.

The consumer transaction device 180 may further comprise a second set of hardware components enabling a secure mode of operation including, but not necessarily limited to, a secure processor 121, secure volatile memory 125, root certificate storage 126 (which may be implemented, for example, as a read-only, non-volatile memory), a credit card reader 191 (e.g., a magstripe and/or smartcard/ICC reader), a keyboard switch 194, an image processor 171, a mixer 181, and a mechanism for indicating to a user when the consumer transaction device is operating in a secure mode, shown on FIG. 1 as "indicator" 193. Such an indicator 193 may be, for example, a green LED which is placed on an outside case of the consumer transaction device 180 and readily visible to a user. In some embodiments, the secure processor 121 may be implemented as software on a generic CPU and may have its own operating system (not shown); in some embodiments, the secure processor 121 may be implemented completely in hardware.

In a non-secure mode, the keyboard switch 194 may operationally connect the keyboard 192 to the operating system 111, the indicator 193 should be turned off, and the mixer 181 may pass all display related signals, commands and/or data from the operating system 111 to the screen 123. In a secure mode of operation, the keyboard switch 194 may operationally connect the keyboard 192 to the secure processor 121, the mixer 181 may pass the signal from the image processor 171 to the screen 123, and the secure processor 121 may cause the indicator 193 to turn on or otherwise become active. In this manner, the same input/output devices (e.g., the keyboard 192 and screen 123) may be used to support both the non-secure and secure modes of operation.

According to this embodiment, the components enabling the secure mode may be operationally separated from the components used in non-secure mode. Accordingly, interactions and/or communications between the operating system 111 (and any applications 112 which are running under it) on the non-secure side and any applications or operations running on the secure processor 121 shall be restricted to a set of limited and well-defined operations, such as passing purchase requests from the operating system 111 to the secure processor 121, and passing the result of purchases from the secure processor 121 back to the operating system 111, as described below.

Additionally, when the consumer transaction device 180 is operating in a secure mode, the image processor 171, the mixer 181, the indicator 193, and the keyboard switch 194 shall be under direct control of secure processor 121 (or another component within the secure zone of operation), i.e., the operating system 111 (or applications 112) have no capability to affect their operation when the consumer transaction device is in a secure mode. This may be achieved, for example, by implementing the secure processor 121 (and other components within the secure zone) on physically separate hardware. In an alternative embodiment, the secure and non-secure modes of operation may be implemented on one or more common set of hardware components by utilizing virtualization techniques. For example, in one embodiment the secure processor 121 and processor 110 may be implemented on the same physical CPU as long as virtualization guarantees a logical separation between the two processors that is equivalent to physical separation.

Also as shown on FIG. 1, the consumer transaction device 180 may communicate with one or more servers 100 to and from which the consumer transaction device may communicate sensitive and/or private information. The server 100 may, for example, host an e-commerce site, a bank web site, a database, or some other form of remotely-accessible software and/or data. In general, and not by way of limitation, the server 100 may comprise a crypto engine 102 for encrypting and decrypting communications with the consumer transaction device 180 and a communications port 104 suitable for communicating with the communications port 118 of the consumer transaction device 180. In some embodiments, the server 100 may be implemented using one or more physically distinct computers (for example, using a load balancer), and may comprise one or more crypto engines 102.

Figure 2A:
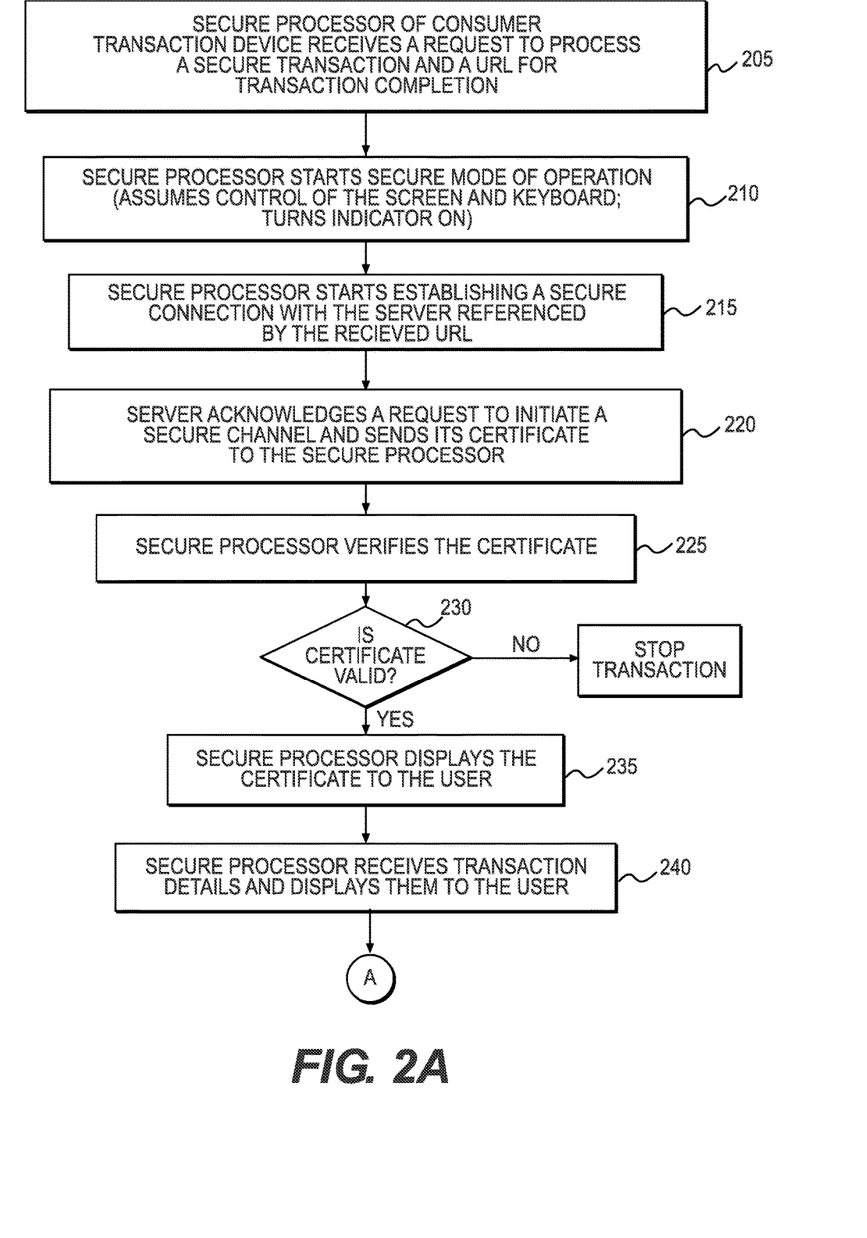
FIGS. 2A-2B represent a flow diagram of an exemplary method according to the present disclosure.
Figure 2B:
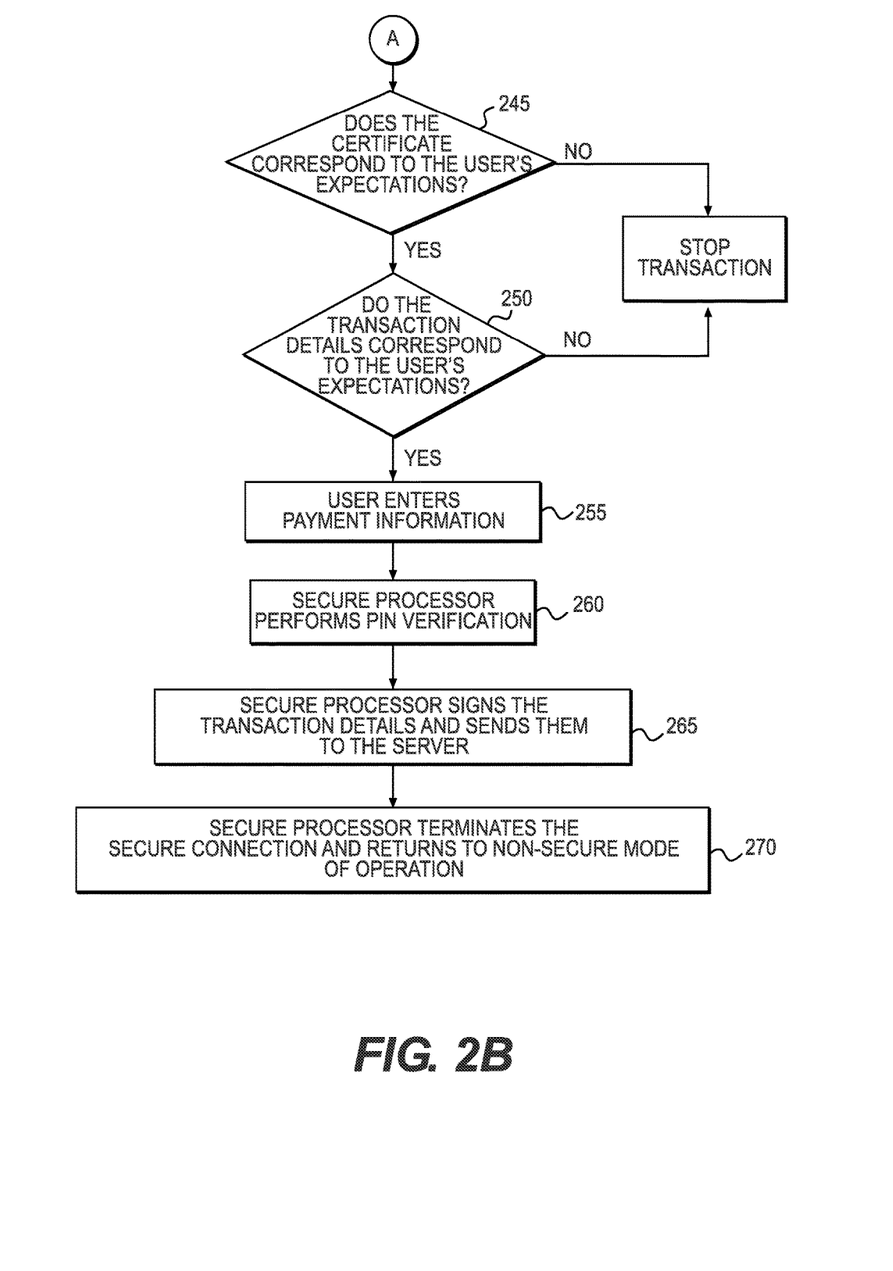
Figure 3:
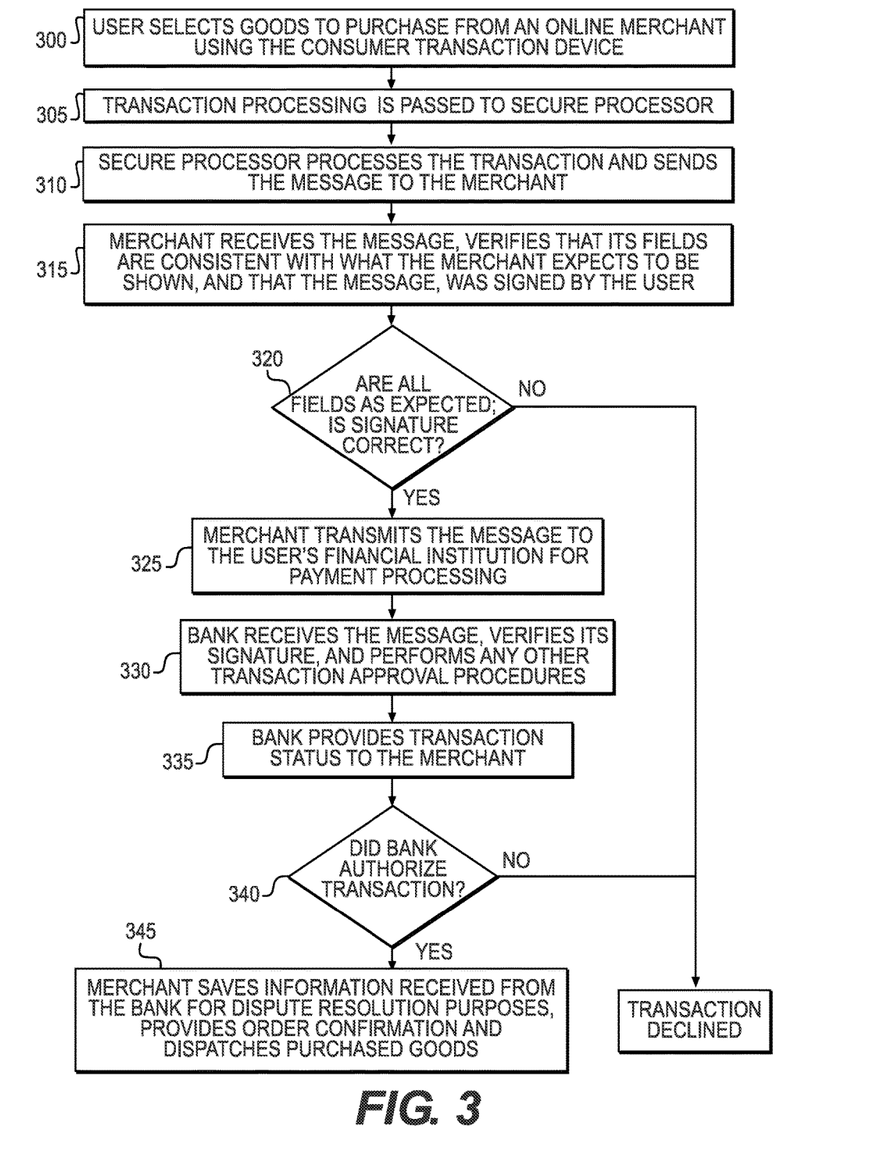
FIG. 3 represent a flow diagram of another exemplary method according to the present disclosure.

FIGS. 2A-2B and FIG. 3 depict exemplary methods for processing online sales or other transactions according to the present disclosure. FIGS. 2A and 2B focus on information flow from the perspective of a consumer transaction device 180, while FIG. 3 focuses at a higher level on the information flow among a consumer transaction device 180, a server 100, and one or more financial institutions associated with the user of the consumer transaction device 180.

As shown on FIG. 2A, at step 205, the secure processor 121 may receive a message containing a purchase transaction request. This message may have been generated by the non-secure zone 189, for example, in response to a user clicking the "check-out" button on a webpage; it may include the URL (or other identifier) of an internet resource which will participate in the processing as described below; in some embodiments, if an HTTP URL is used, it may also additionally include any relevant HTTP headers, and/or any associated cookies.

As a result, at step 210, the secure processor 121 may start the secure operation of the consumer transaction device 180 by assuming control over the screen 123 and keyboard 192. To do this, the secure processor 121 may send instructions to the keyboard switch 194 to operationally disconnect the keyboard 192 from the non-secure components and to operationally connect it to the secure processor 121; and may further send instructions to the mixer 181 to display images from the image processor 171 instead of the processor 110 (to ensure that the operating system 111 no longer has control of the screen 123).

Additionally, to provide an affirmative confirmation to the user that the system is operating in a secure mode, the secure processor 121 may cause the indicator 193 to turn on or otherwise become active. In a secure mode of operation, no information relating to the secured transaction may be accessible (except perhaps in an encrypted form) to any of the non-secure components, such as the non-secure processor 110, operating system 111 and/or any of the applications 112. In other words, a "virtual computer" may be formed at this point, comprising a secure processor 121, a keyboard 192, a screen 123, a card reader 191, and any other components necessary to implement the virtual computer. This "virtual computer" may be self-contained and self-sufficient (meaning that it does not depend on non-secure zone 189 to complete its operations) except that, as described in further detail below, it may use the non-secure zone's network transport facilities (e.g., a TCP/IP stack) to communicate with the server 100. Nevertheless, to the extent that any information, data and/or messages are provided from any secure components to the non-secure zone 189 (e.g., to be transmitted to the server 100 using the TCP/IP stack of the operating system 111), that information, data and/or messages may be in an encrypted format wherein the operating system 111 and or any applications 112 running under it do not have the capability to decrypt the information.

At step 215, the secure processor 121 may start establishing a secure connection with a server 100 of the selling entity (e.g., an e-commerce web site) using the URL received from the non-secure components of the consumer transaction device 180. By way of example and not limitation, the secure connection may be an HTTPS (HTTP over SSL) connection. As noted previously, in communicating with the server 100 over the secure connection, the secure processor 121 may use the network transport capabilities of the operating system 111 running on the non-secure processor 110. In such an embodiment, the operating system 111 acts merely as an intermediary to transmit the secure SSL messages without the capability to determine and/or alter the content of the SSL messages. In one embodiment, for example, the operating system 111 may be responsible for implementing TCP/IP communications while the secure processor 121 may be responsible for processing the "payload" that is communicated over the TCP/IP connection. In another embodiment, the operating system 111 running on the non-secure processor 110 may be responsible for implementing the first four layers of the open systems interconnection (OSI) model (i.e., the physical layer, data link layer, network layer and transport layer), while the secure processor may be responsible for implementing layers five through seven (i.e., the session layer, presentation layer and application layer). It is to be recognized that other similar models of separating the processing among the operating system 111 and the secure processor 121 are also within the scope of the present disclosure, as long as cryptographic processing stays within the secure processor 121. In this manner, the operating system 111 cannot "eavesdrop" or affect the SSL messages (or other encrypted messages) between the secure processor 121 and the server 100. In an alternative embodiment, the secure processor 121 may implement the entire TCP/IP stack or the entire OSI model such that it may directly use the communication port 118 to communicate with the server 100.

Optionally, in the process of establishing a secure encrypted channel, the secure processor 121 may authenticate itself to the server's crypto engine 102 (for example, by using an SSL client certificate, or by sending to the crypto engine 102 a message signed by a key that is specific to the secure processor 121 of the transaction device 180).

At step 220, the server 100 may send a response to the secure processor 121 of the consumer transaction device 180 acknowledging the request to establish a secure encrypted channel (in this example, an SSL channel). The consumer transaction device 180 may then establish the secure channel (in this example, an SSL channel) between the crypto engine 102 of the server 100 and the local device's secure processor 121.

In the process of establishing the secure encrypted channel, the crypto engine 102 of the server 100 may authenticate itself to the consumer transaction device 180 using a digital certificate. For example, each server 100 may have a private key and a corresponding digital certificate which has been signed by a "root certificate" belonging to a recognized and well-respected certificate authority. The secure processor 121 may have already stored a copy of this root certificate in certificate storage 126, or may have an alternative mechanism (for example, by storing the public key of the certificate authority instead of the root certificate) for verifying that the provided digital certificate is legitimate. It will be understood that multiple "root certificates" and more elaborate public key infrastructure (PKI) schemas, as well as alternative schemas for signature validation (such as the simple public key infrastructure (SPKI), simple distributed security infrastructure (SDSI) or pretty good privacy's (PGP's) "web of trust") are also possible within the scope of present disclosure.

In some embodiments, the server's certificate may differ slightly from a traditional certificate, such that it contains not only a text entry capable of identifying the certificate owner (usually the "CN" field of an X.509 digital certificate), such as the name of the merchant associated with the server 100, but may further contain an image (for example, PNG or JPEG) with a visual representation of the identity of the certificate owner. This image may be a part of the digital certificate in the sense that it may be encompassed by the signature of the certificate issuer in the same way that the other fields of the certificate are encompassed; for example, if an X.509 certificate is used, such an "identity image" may be included in an "Extension" field of the X.509 certificate. As will be described in further detail below, in some embodiments, it may also be desirable to show this "identity image" on a pre-designated portion of the screen 123 during the entire time that the consumer transaction device 180 is operating in a secure mode and communicating with the server 100.

At step 225, the secure processor 121 of consumer transaction device 180 may receive the certificate of the server 100 and verify its authenticity using a root certificate accessible to the secure processor 121 (e.g., stored in root certificate storage 126). If, at step 230, the certificate is found invalid, the transaction may be stopped.

Otherwise, at step 235, the secure processor 121 may instruct the image processor 171 and mixer 181 to display the certificate to the user. For instance, when the secure processor 121 extracts an identity image from the certificate, it may pass the image to the image processor 171 for any necessary processing or rendering, and then the image may pass through the mixer 181 for display on the screen 123. To enhance security, in one embodiment, the identity image may be displayed on a predefined or predesignated area of the display 123 until the transaction is completed or aborted. Alternatively or additionally, the name of the entity operating the server 100 may be displayed on the screen 123 until the transaction is completed or aborted.

At step 240, the secure processor 121 may receive transaction details from the server 100 and display them to the user. By way of example and not limitation, the secure processor 121 may receive HTML code (and/or other code, such as JavaScript) that, when processed by the secure processor 121, renders a web-based form for displaying and/or completing the transaction details. The secure processor 121 (with or without the aid of the image processor 171, depending on the specific implementation and the capabilities of the processor 121) may execute the received commands, information and/or code, and then an image of the form may pass through the mixer 181 for display on the screen 123. In an alternative embodiment, and assuming that the secure processor 121 has minimal processing capabilities such that it cannot execute JavaScript and/or render HTML to render a screen displaying transaction information, the secure processor 121 may receive an image (e.g., a PNG or JPEG) containing the relevant transaction information in a pre-rendered format. When the secure processor 121 receives such an image, it may pass the image to the image processor 171 for rendering, and then the image may pass through the mixer 181 for display on the screen 123.

Optionally, if the secure processor 121 is capable of rendering at least digits and currency symbols, in addition to the image, information such as currency and the amount of payment may be communicated to the secure processor 121 in digital form. In such an embodiment, information may be rendered and displayed to the user, for example, in a second designated area of the screen 123.

If, at step 245, the information displayed on the display 123 does not correspond to the user's expectations (for example, a valid certificate for "XYZ, Inc." is displayed where the user expected to see the certificate for "Amazon.com"), the user may stop the secure transaction processing (for example, by pressing a predefined button on keyboard 192). If the displayed certificate aligns with the user's expectations, the method may proceed to step 250.

If, at step 250, the transaction details (for example, the amount to be paid and/or the purpose of the payment) do not correspond to the user's expectations (for example, instead of the intended $5 for stationery the user is about to transfer $5,000 to the personal account of a person she does not know), the user may elect to terminate a suspicious transaction. Thus, according to the present disclosure, before completing the transaction, the user may confirm that the information received from the server 100 is genuine and the channel is secure by checking that the indicator 193 is on and that the transaction information displayed on the screen 123 (such as the identity image, transaction amount and the purpose of the payment) corresponds to the user's expectations for this transaction. If the information displayed on the screen 123 does not match the user's expectations—e.g., the payment amount is incorrect, or the identity image is not displayed—the user may terminate the transaction before any payment or payment authorization is transmitted to the server 100.

At step 255, the user may enter any information that may be necessary to complete the transaction. For example, the user may be requested to insert a credit card into the card reader 191 (and optionally enter a PIN number on the keyboard 192 or a separate keypad (not shown)) and to confirm that she consents to the transaction as it is displayed.

In one embodiment, at step 260, if a PIN has been entered, the secure processor 121 may verify the PIN. This verification may be implemented as either an "offline PIN" verification wherein the PIN is verified against information stored on the card itself, or as an "online PIN" verification wherein the secure processor issues a request to a payment network of one or more financial institutions (via server 100) to verify the PIN.

In one embodiment, at step 265, if (i) the card reader 191 is capable of reading an ICC, (ii) the card inserted into the reader 191 is an ICC, and (iii) the merchant has indicated that it is willing to process ICC transactions, the secure processor 121 may initiate the process of using the ICC to digitally sign certain transaction information. To do so, the secure processor 121 may request that the ICC generate a message (similar to an authorization request cryptogram (ARQC) as used in the Europay, MasterCard and Visa (EMV) global standard for interoperation of ICCs) that contains a cryptographic message authentication code (MAC) encompassing certain portions of that message. This message may include information about the currency and amount of the transaction (which are normally present in an ARQC message), and additionally may include a hash of the transaction details (e.g., from step 240), and a hash of the identity of the merchant as it was presented to the user (e.g., from the merchant certificate, as it was shown to the user). Instead of incorporating a hash of certain information, the message may instead include the actual information (e.g., instead of a hash the merchant identity, the actual merchant identity). Additionally, the credit card PIN, the transactional details and/or the identity of the merchant (or their respective hashes) may be taken into account when calculating the MAC to ensure the integrity of the transactional details and/or the merchant's identity. It will be understood, however, that while the credit card PIN is used for the calculation of the MAC, the credit card PIN itself should preferably not be included in the message, so it remains inaccessible for unintended parties (such as, for example, the merchant).

It is to be recognized that the actual information that is digitally signed may vary based on the specific embodiment implemented and that the examples herein are not intended to be limiting. For example, in an embodiment in which an image is displayed to the user, the hash of that image may be included in the digital signature. As the digital signature may contain exactly the information that was shown to the user, it may be seen as a signature under contract which is formed between the user and the merchant at the moment of purchase, and may later be used for dispute resolution purposes. Additionally, it is to be recognized that other methods of digital signatures—for example, based on public/private key cryptography—may be used instead of or in addition to the MAC. If public/private key cryptography is used, in some embodiments the message may contain two separate signatures—one signing all fields except for the PIN, and another signing the PIN (with, potentially, a random salt added). Such an approach will allow the merchant to validate a digital signature itself without compromising the PIN.

Once the message has been signed, it may be sent to the merchant's server 100 for processing.

When the transaction is complete, at step 270, the secure processor 121 may disconnect from the server 100 (or at least terminate the secure connection to the server 100) and revert back to the non-secure mode of operation.

After the secure mode of operation has terminated, the secure processor 121 may cause the indicator 193 to turn off or otherwise be inactive, and may instruct the keyboard switch 194 and the mixer 171 to switch back to non-secure mode, i.e., to process keyboard 192 input and screen 123 output through the operating system 111. Additionally, the secure processor 121 may pass information about the outcome of the transaction back to operating system 111 for further processing. For example, the secure processor 121 may pass back to the operating system the URL of the web page that indicates whether the transaction was successful or not. This page may be shown in the web browser and may provide, for example, a transaction reference number that the user may elect to save and/or print, and it may also include different links depending on whether the transaction was successful or not.

As noted previously, FIG. 3 focuses on an exemplary information flow among a consumer transaction device 180, a server 100, and one or more financial institutions associated with the user of the consumer transaction device 180 during an online purchase transaction.

At step 300, a user of the consumer transaction device 180 may select a product or service to be purchased from a web site hosted on server 100. This may happen, for example, while the consumer transaction device 180 is in a non-secure mode and the user is browsing the Internet using a web browser running as one of the applications 112 under the operating system 111. When the user is ready to engage in a secure transaction (e.g., complete a purchase), at step 305, the non-secure components of the consumer transaction device 180 may pass secure transaction processing to the secure processor 121. This may occur, again, for example, by having the non-secure components transmit a purchase request (for example, the URL of the Internet resource as described in greater detail above) to the secure processor 121.

At step 310, the secure processor 121 may process the transaction and send the (optionally signed) message to the merchant, e.g., as described with respect to steps 205-270 on FIG. 2.

At step 315, the merchant may receive the message formed by the customer transaction device and may verify that the amount of the transaction, the supplied currency, and the hash of the merchant ID and transaction details (which in some embodiments may, as it was described with respect to step 265, be represented as their actual values) are consistent with what the merchant expects to be signed by the user. If, at step 320, the merchant determines that the received values are not the same as anticipated by the merchant, the merchant may select to decline the transaction as based on inconsistent information and potentially fraudulent or otherwise unauthorized. If, however, the received values are as expected, at step 325, the merchant may save a copy of the message for any potential future dispute resolution, and may transmit a copy of the message to the user's bank or financial processor for further transaction processing.

It should be noted that if the MAC is used as a digital signature, the merchant will not be able to verify that the signature is valid; nevertheless, the merchant may verify that fields other than the MAC in the message are correct, as this may be important for dispute resolution purposes. In other embodiments, if public/private key cryptography is used for a digital signature, the merchant may be able to verify the digital signature, and terminate the process if the signature is invalid.

It will be understood that, while the merchant can verify whether the user has initiated the transaction by using details previously specified by the merchant, the user's sensitive information (such as, for example the user's credit card PIN, and any other communications between the user's transactional device and the bank) preferably are not accessible by the merchant; this can be achieved, for example, by encrypting corresponding parts of the message with the key(s) which are known to both the ICC and the bank, but are not known to the merchant.

At step 330, the user's bank may receive the message from the merchant, verify the digital signature on the message (previously generated by the secure processor 121 at step 265), and perform any other appropriate approval procedures. For example, the user's bank may verify whether the user has sufficient funds to perform the transaction. If signature verification fails, or the user has insufficient funds, the bank may decline the transaction. It will be understood that, while the merchant may not be able to verify the signature, an invalid signature of valid data will lead to a transaction decline. As a result, only transactions for which the integrity of their related data is proven, may be accepted.

At step 335, the bank may respond to the merchant and provide a transaction status. If, at step 340, the bank has authorized the transaction, at step 345, the merchant may store the bank confirmation for future dispute resolution purposes, provide an order confirmation to the user, and ultimately dispatch the purchased goods.

It shall be noted that even if the merchant was not able to validate the user's signature at step 320, the merchant will have sufficient information for future dispute resolution purposes to prove that a contract was formed between the user (using his ICC) and the merchant, as well as the details of that contract, if (i) the merchant ensured that all of the fields in the message forwarded to the bank were correct, and (ii) the merchant has confirmation from the bank that the bank verified the ICC signature of the same message.

It shall be noted that the embodiment described above, which incorporates identity images within the server's certificate, is designed to minimize the complexity of the secure processor 121 and the image processor 171. In other embodiments, however, this is not required. For example, an alternative embodiment may use a text identifier (e.g., the traditional "CN" field of an X.509 certificate). This will require either the secure processor 121 or the image processor 171 to provide some font rendering capabilities in order to display the server institution's name on the screen 123. In yet another embodiment, the server 100 may send HTML (or XML) page to the secure processor 121 (which will be shown to the user and potentially signed by ICC). This would require an appropriate rendering engine to be included into either the secure processor 121 or the image processor 171.

It will be understood that, though the present discussion has focused on communication with an e-commerce web site, consumer transaction devices 180 according to the present disclosure may interact with multiple different merchants, web sites, banks, and other institutions.

Figure 4:
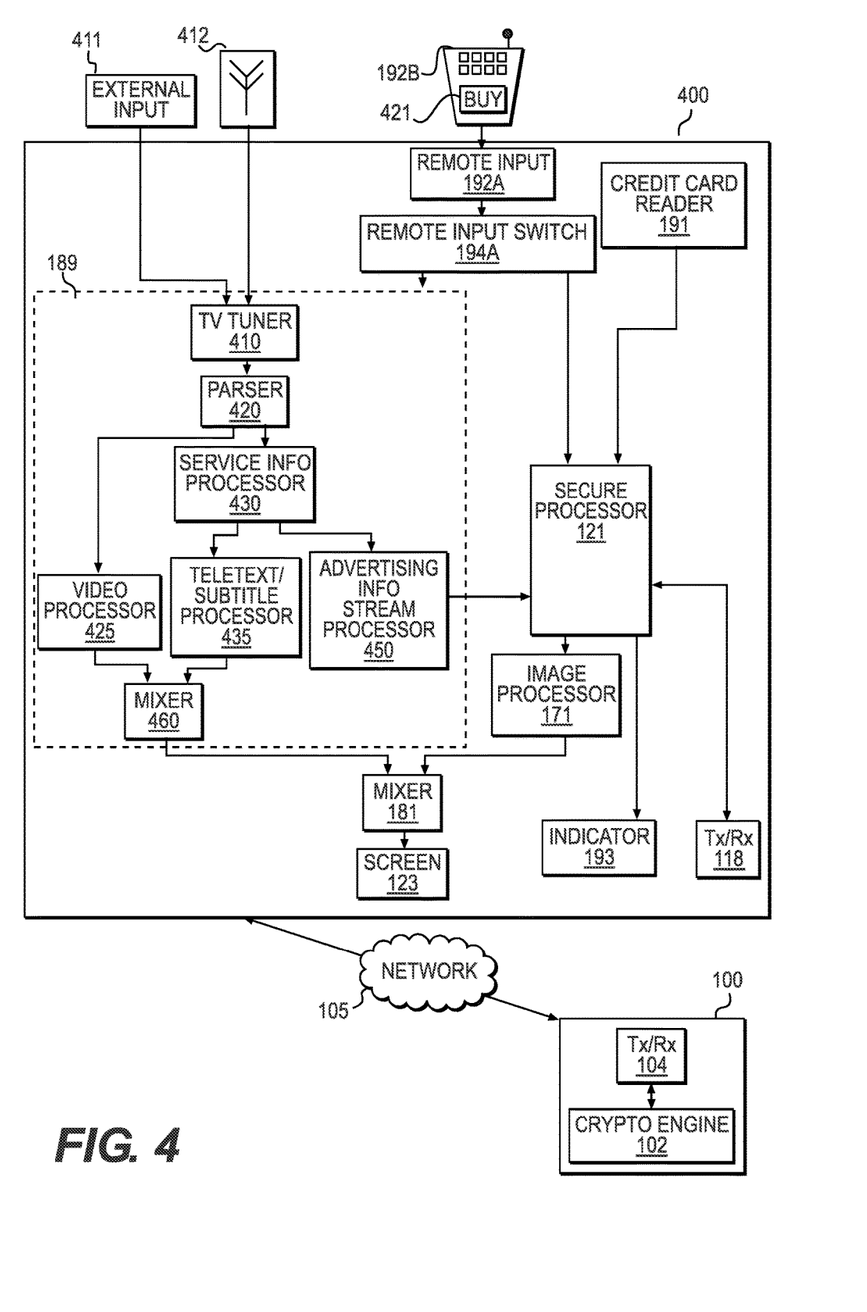
FIG. 4 is a block diagram of another embodiment according to the present disclosure.

FIG. 4 is a block diagram of another embodiment according to the present disclosure in which the secure mode of operation capabilities discussed herein are integrated into a television set 400. The television set 400 may comprise "traditional" components, such as a television tuner 410 (including associated inputs 411 and antenna connections 412), a television signal parser 420, and a video signal processor 425. The television set 400 may further include a service information processor 430, a teletext or subtitle processor 435, and a mixer 460, as well as other components (not shown) typically present in a television set. These components may be implemented as separate physical units, or may be logical and/or functional blocks within one or more integrated processing units. Remote input 192A (for example, an infrared receiver) may be used to receive control signals from a remote control 192B (for example, an infrared remote control) operated by a user. The visual output of the television set 400 may be displayed on the screen 123.

The television set 400 may receive (in a non-secure mode of operation) an input data stream and use the parser 420 to extract the information content within that input data stream. In one mode of operation, for example, the television set 400 may receive a television signal (for example, an NTSC TV signal) at the television tuner 410 via the antenna 412 and use the parser 420 to extract the informational content within that signal. The television signal may include video information, audio information, and/or service information. As discussed further, the service information may be any of teletext information, subtitles and/or other types of information. In another exemplary mode of operation, the television set 400 may receive through the external input 411 media content in a compressed container bitstream format (for example, the MPEG-4 format). Again, the television set 400 may use the parser 420 to process the container bitstream and extract the various component streams contained within the container (for example, video, audio, subtitles, etc.).

After the input into the television set 400 has been parsed into its various components, each component may be further processed according to its type. For example, video information may be processed using the video signal processor 425. If the video information is encoded in a digital format, for example, the video signal processor 425 may perform video stream decoding. Service information, such as subtitle information, teletext and or advertising information, may be passed to the service information processor 430 in order for it to determine the type of service information at issue. Once the service information processor 430 determines the type of service information, it may then pass the information to one or more appropriate processors for further processing. For example, if the service information processor determines that the service information is teletext information or subtitle information, it may forward the information to the teletext and subtitle processor 435, and if it determines that the service information is advertising information it may pass that to the advertising information stream processor 450. In an alternative embodiment, the functionality of the service information processor 430 may be incorporated into the parser 420.

The teletext and subtitle information processor 435 may extract text and/or images that may be incorporated into a teletext and/or subtitle information stream and render the information into images that can be combined with the video information and displayed. In the example in which the TV receives an MPEG-4 container, for example, the subtitle information may be contained within its own distinct stream, which may be extracted and decoded by the teletext and subtitle processor 435 and rendered as images.

Decoded video from the video signal processor 425 and rendered images from the teletext and subtitle processor 435 may then be mixed by the mixer 460 to generate a resulting picture to be displayed on the screen 123; for example, the mixer 460 may overlay semi-transparent subtitle images coming from the teletext/subtitle processor 435 over rendered video stream coming from the video signal processor 425

The input data stream received by the TV 400 may also include an "advertising information" component. This advertising information may be incorporated into the service information. For example, the advertising information may be encoded as teletext information, incorporated into the subtitle stream of a media container bitstream (e.g., an MPEG-4 container bitstream), or incorporated into its own distinct stream of a media container bitstream. In one embodiment, when incorporated into a media container bitstream, at the point when the video stream contains the start of the video advertising sequence, the "advertising information" stream may include a chunk comprising (i) a URL corresponding to the video advertising sequence that has just started in the video stream, and (ii) a duration for which this URL will be active (which may correspond to the duration of the video advertising sequence).

The chunks of an advertisement information stream may have a predefined structure. For example, the content of each advertising information chunk may include at least a URL (and, optionally, other associated information) for an Internet resource to be used as described above, and a duration of the advertisement. To process advertisement information streams, the TV set 400 may have an advertisement information stream processor 450.

Further details regarding how the advertising information may be processed are provided below.

The television set 400 may further include a secure processor 121, a credit card reader 191, a remote input switch 194A, an image processor 171, a mixer 181, a communication port 118 and an indicator 193. These components, as shown on FIG. 4, operate in a similar manner to the same components shown on FIG. 1. Accordingly, the television set 400 may also operate in a secure mode, similar to that described with respect to FIGS. 1 and 2. Whether and when the television set 400 operates in the secure mode may be controlled by the secure processor 121.

In the exemplary embodiment shown on FIG. 4, a user may use the remote control 192B to provide input to the television set 400. The user's commands, as inputted into the remote control 192B, may be received by the remote input receiver 192A and transmitted either to the secure processor 121 (if the television is operating in a secure mode) or to the traditional components (if the television is operating in a non-secure mode) via the input switch 194A.

In one embodiment, the television set 400 may receive an input data stream representing a product advertisement wherein the input data stream includes an advertising information component. The input data stream may be parsed and the service information processor 430 may determine that the advertising information component should be forwarded to the advertising information stream processor 450. The advertising information stream processor 450 may extract a URL (and other associated information, if any) from a correspondent portion of the advertising information stream and may store it for later reference.

If a user presses a "buy" button 471 on the remote control 192B at the time when information about the advertised product is being displayed on the screen 123, the signal representing that action may be passed to the advertisement information stream processor 450, which may then initiate a transition to the secure mode of operation by passing the currently stored URL of the web site from which the product can be purchased (or a URL as processed below) to the secure processor 121.

In some embodiments, at the time that the URL is passed to the secure processor, the secure processor may also receive user information such as the address of the user to which the purchased product should be delivered. In one implementation, the secure processor 121 may provide an interface through which the user may enter this address information using the remote control 192B. In another implementation, the user may provide the address information in advance, and that information may be stored in a non-volatile memory in the television set 400 for later retrieval by the secure processor 121. In another implementation, assuming that the delivery address is the same as the billing address of the user with the Internet service provider (which is normally the case), the secure processor 121 may request (for example, via the communications port 118) the billing address from the Internet service provider (ISP) that provides the Internet service to which the communications port 118 is connected. The ISP may respond to the request by providing the billing address information associated with the IP address from which the request came (noting that, from the ISP's point of view, it can be either the IP address of the communications port 118, or the IP address of an intermediate router).

In yet another implementation, the cable TV service provider may embed address information into the TV signal as service information that can be processed by the service information processor 430. For example, the cable TV service provider may embed state, city and/or zip information common to a set of users which correspond to a particular "point of presence" for cable TV service providers, as well as a list of street and building numbers within that common geographic location in the TV signal. Then the user needs only to complete his address information by selecting the appropriate street and building number information from the available choices. Given appropriate capabilities, the cable TV service provider may individually embed specific address information for each TV that receives the TV signal.

Regardless of the manner in which the address information is received, it can be combined with the URL information extracted from the video stream to obtain a URL that contains the characteristics of the product being advertised and the delivery address. For example, if the user is watching an advertisement for a local pizzeria advertising a pizza margherita, and he presses the "buy" button 471 on the remote control 192B while the advertisement is being displayed, the advertising information stream processing unit 450 may obtain the URL associated with the currently displayed advertisement (for example, "https://www.pizza.example.com/?product=Pizza+Margherita"), combine that URL with the delivery address information obtained according to one of the methods described above (for the purpose of the current example, assume it is "123 Main Street, Anytown, ST, 11111), to produce a combined URL (e.g., using standard URL encoding rules, this URL may be "https://www.pizza.example.com/?product=Pizza+Margherita&address=123+Main+Street%2C+Anytown%2C+ST%2C+11111"), and pass that combined URL to the secure processor 121.

When the appropriate URL has been created and passed to the secure processor 121, the secure processing components of the television set 400 in the embodiment of FIG. 4 may interact with the server from which the product may be purchased in a manner similar to that described with respect to FIGS. 1, 2A-2B, and 3.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application— such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A computing device comprising:
   a screen;
   a user input device;
   a first switching device coupled to the screen;
   a second switching device coupled to the user input device;
   a non-secure processor configured to generate a message containing a secure transaction request;
   a secure processor configured to:
   receive the message containing the secure transaction request;
   send an instruction to the first switching device to operationally connect the screen to the secure processor and to operationally disconnect the screen from the non-secure processor while the computing device is operating in a secure mode;
   send an instruction to the second switching device to operationally connect the user input device to the secure processor and to operationally disconnect the user input device from the non-secure processor while the computing device is operating in the secure mode;
   establish a secure connection with a server according to an encryption algorithm, wherein data packets communicated via the secure connection are encrypted according to the encryption algorithm;
   receive a certificate of the server and authenticate the certificate;
   display at least a subset of information from the certificate on a predefined or predesignated area of the screen until the secure transaction is completed or aborted;
   receive transaction details from the server and display them on the screen;
   receive confirmation that the certificate and transaction details correspond to expected information;
   receive payment information to be submitted to the server;
   digitally sign certain transaction information; and
   send the digitally signed certain transaction information to the server;
   return the computing device to a non-secure mode of operation upon completing the secure transaction; and
   a credit card reader operatively connected to the secure processor.

2. The computing device of claim 1, wherein the credit card reader is not connected to the non-secure processor.

3. The computing device of claim 1, wherein the non-secure processor is configured to execute an operating system and one or more applications to run on the operating system.

4. The computing device of claim 1, wherein the message is provided by an application running on the non-secure processor.

5. The computing device of claim 1, wherein the certain transaction information comprises at least one of a currency of the secure transaction, an amount of the secure transaction, and an identity of a merchant displayed on the screen.

6. The computing device of claim 1, wherein the certain transaction information comprises an identity of a merchant.

7. The computing device of claim 1, wherein the certain transaction information comprises the transaction details displayed on the screen.

8. The computing device of claim 1, further comprising an indicator to be activated when the computing device is operating in the secure mode.

9. The computing device of claim 1, wherein the secure processor is configured to digitally sign the certain transaction information by transmitting a request to the credit card reader to digitally sign the certain transaction information and receiving the digitally signed certain transaction information from the credit card reader.

10. The computing device of claim 1, wherein the secure processor is further configured to display on the screen an identity image contained in the certificate when the computing device is operating in the secure mode.

11. The computing device of claim 10, wherein the identity image is displayed in the predefined or pre-designated portion of the screen while the computing device is operating in the secure mode.

12. The computing device of claim 1, wherein the non-secure processor is coupled to a television signal processing unit in a non-secure zone and the message is generated by the television signal processing unit.

13. A computer-implemented method for performing a transaction in a secure mode by a computing device comprising a secure processor and a non-secure processor, the method comprising:

receiving, at the secure processor, a message containing a secure transaction request;

generating, by the secure processor, an instruction to a first switching device to operationally connect a screen to the secure processor and to operationally disconnect the screen from the non-secure processor while the computing device is operating in the secure mode;

generating, by the secure processor, an instruction to a second switching device to operationally connect an input device to the secure processor and to operationally disconnect the input device from the non-secure processor while the computing device is operating in the secure mode;

establishing, by the secure processor, a secure connection with a server according to an encryption algorithm, wherein data packets communicated via the secure connection are encrypted according to the encryption algorithm;

receiving, by the secure processor, a certificate of the server and authenticate the certificate;

displaying, by the display, at least a subset of information from the certificate on a predefined or predesignated area of the screen until the secure transaction is completed or aborted, wherein the at least the subset comprises an identity image;

receiving, by the secure processor, transaction details from the server and display them on the screen;

receiving, by the secure processor, a confirmation that the certificate and transaction details correspond to expected information;

receiving, by the secure processor, payment information to be submitted to the server;

digitally signing, by the secure processor, certain transaction information;

sending, by the secure processor, the digitally signed certain transaction information to the server; and returning, by the secure processor, the computing device to a non-secure mode of operation upon completing the secure transaction.

14. The computer-implemented method of claim 13, further comprising executing an operating system on the non-secure processor and one or more applications to run on the operating system.

15. The computer-implemented method of claim 14, wherein the message is provided by the non-secure processor.

16. The computer-implemented method of claim 13, wherein the certain transaction information comprises at least one of a currency of the secure transaction, an amount of the secure transaction, and an identity of a merchant as displayed on the screen.

17. The computer-implemented method of claim 13, wherein the certain transaction information comprises the transaction details displayed on the screen.

18. The computer-implemented method of claim 13, further comprising activating an indicator indicative of the secure mode.

19. The computer-implemented method of claim 13, wherein the digitally signing the certain transaction information further comprises:

transmitting a request to a credit card reader to digitally sign the certain transaction information; and receiving the digitally signed certain transaction information from the credit card reader.

20. The computer-implemented method of claim 13, further comprising displaying an identity image contained in the certificate on the screen.

21. The computer-implemented method of claim 20, wherein the identity image is displayed in the predefined or pre-designated portion of the screen while in the secure mode.

22. The computer-implemented method of claim 13, wherein the message is generated by a television signal processing unit.

23. The computer-implemented method of claim 19, wherein the credit card reader is not connected to the non-secure processor.

24. The computer-implemented method of claim 13, wherein the non-secure processor is coupled to a television signal processing unit in a non-secure zone and the message is generated by the television signal processing unit.

* * * * *